Figure 1:
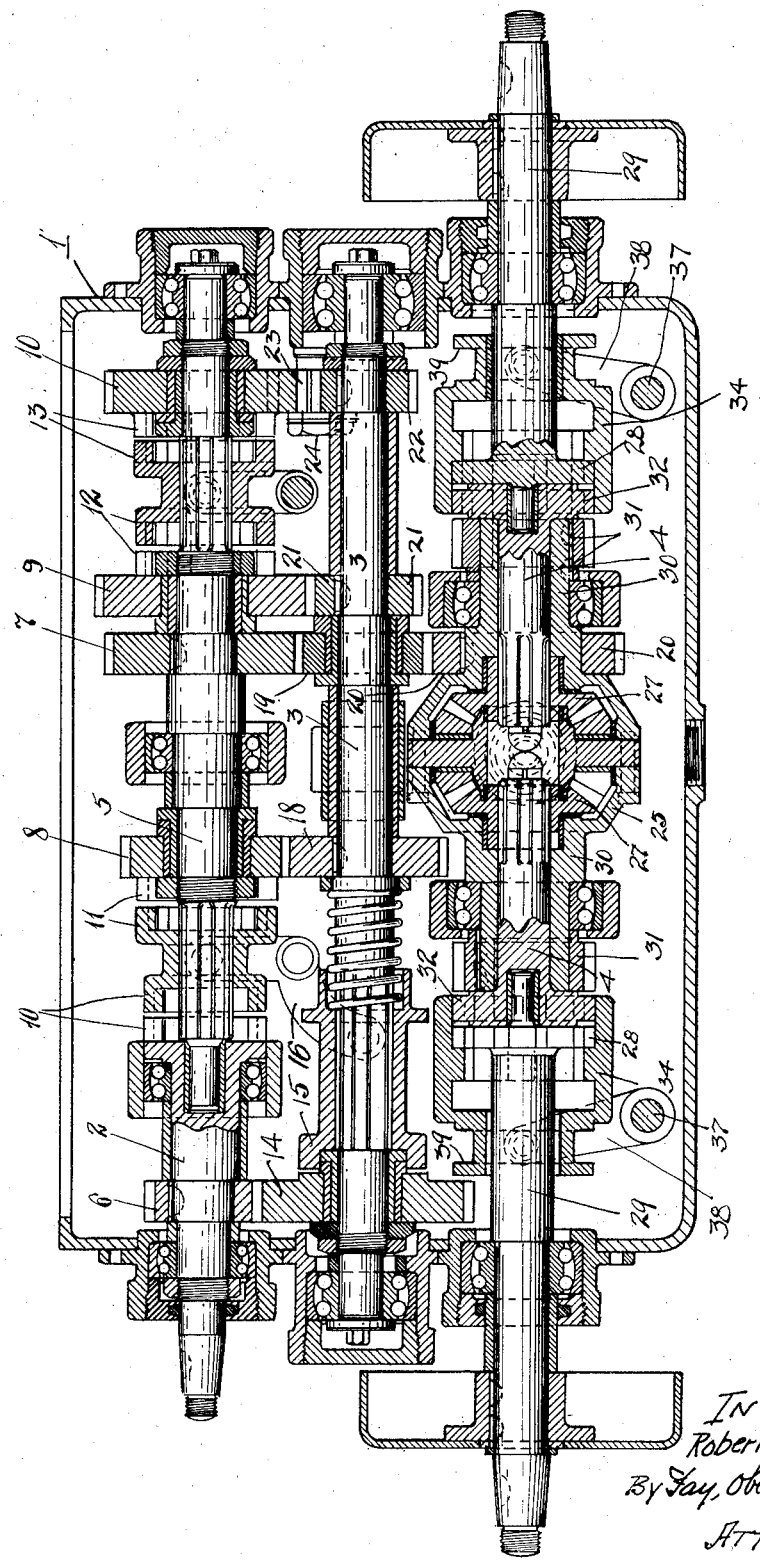

R. KECK.
TRANSMISSION MECHANISM.
APPLICATION FILED JULY 23, 1918.

1,362,490.

Patented Dec. 14, 1920.
2 SHEETS—SHEET 1.

INVENTOR
Robert Keck
By Fay, Oberlin & Fay
ATTORNEYS.

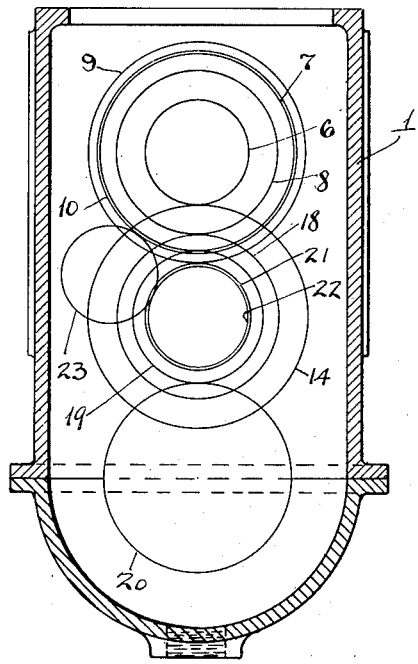
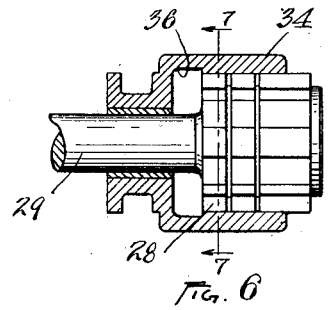
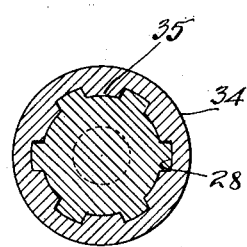
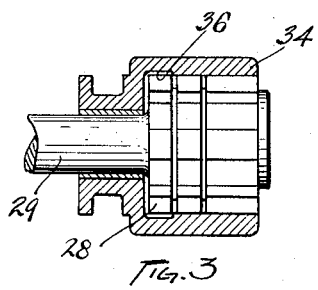
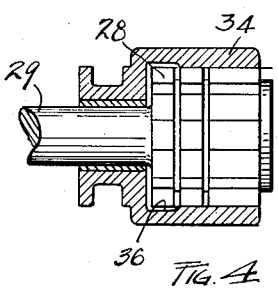
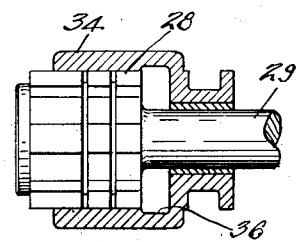

UNITED STATES PATENT OFFICE.

ROBERT KECK, OF CHICAGO, ILLINOIS, ASSIGNOR TO THE DOUBLE-DRIVE TRUCK COMPANY, OF CHICAGO, ILLINOIS, A CORPORATION OF SOUTH DAKOTA.

TRANSMISSION MECHANISM.

1,362,490.  Specification of Letters Patent.  Patented Dec. 14, 1920.

Application filed July 23, 1918. Serial No. 246,286.

*To all whom it may concern:*

Be it known that I, ROBERT KECK, a citizen of the United States, and a resident of Chicago, county of Cook, and State of Illinois, have invented a new and useful Improvement in Transmission Mechanism, of which the following is a specification, the principle of the invention being herein explained and the best mode in which I have contemplated applying that principle, so as to distinguish it from other inventions.

The present invention, relating, as indicated, to transmission mechanism, is more particularly directed to the provision of a transmission mechanism for use under conditions where it is desirable to drive shafts extending in opposite directions by a single driving shaft, such a condition being found, for example, in a four-wheel drive truck vehicle, in which both the front and rear axles must be driven by the engine, preferably through a single transmission. Another object of the invention is the provision of such a transmission with the use of the least number of shafts and gears and with a positive gear connection between driving and driven members without the use of any other driving means, such, for example, as chains or the like. A still further object of the invention is the provision of equalizing or differential means for differentiating the power delivered by the engine shaft to the two propeller or driven shafts, either against rotation or for simultaneous rotation, or for entirely disconnecting them from the driving mechanism. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawings:—

Figure 1 is a longitudinal vertical section through my improved transmission mechanism and case therefor; Fig. 2 is an end elevation of the same showing the relative position of the shafting diagrammatically; Figs. 3, 4, 5 and 6 are longitudinal transverse sections taken on the same planes as Fig. 1 and showing in various positions the locking mechanism for the driven shafts; and Fig. 7 is a section on the line 7—7, in Fig. 6.

In Fig. 1 there is shown a transmission casing 1 of any suitable form, in which are mounted in vertical alinement a driving shaft 2, a counter shaft 3 and driven or propeller shafts 4. The driving shaft 2, which may be connected to any suitable source of power is provided with a centrally disposed recess in the end extending into the casing 1, in which is centered and journaled another shaft 5, which is of course in alinement with the driving shaft 2, and which is also vertically above the counter shaft 3. On these two alined shafts 2 and 5 are keyed gears 6 and 7 respectively, while other gears 8, 9 and 10 are rotatably mounted on the shaft 5 and may be fixed thereto by means of clutches 11, 12 and 13. Each of these clutches is formed with one set of jaws attached to one of the gears and with the other set formed as a part of a slidable collar keyed to the shaft 5. The clutch 11 is a double clutch with a second clutch 10 formed in front of the clutch 11 and engaging the shafts 2 and 5 so that the latter may be directly driven from the former.

The counter shaft 3 carries a gear 14 in mesh with the gear 6 on the shaft 2, the gear 14 being normally free on the shaft 3 and being capable of engagement therewith by a clutch 15, which is operated by means of a single lever 16, which at the same time actuates the clutches 10 and 11. The clutches 10 and 15 are so related that one or the other is always engaged, no matter what position the lever 16 is in, as a spring 17 serves to engage the clutch 15 upon movement of the lever 16 in a clockwise direction, which disengages the clutch 10. Further movement of the lever 16 in the same direction engages the clutch 11, while clutch 15 remains in engagement due to the action of the spring. Upon a reverse movement of the lever 16 the clutch 11 is first disengaged and then clutch 10 is engaged, while this movement of the lever also causes disengagement of clutch 15.

On the shaft 3 there is also mounted a gear 18 in mesh with the gear 8 on the shaft 5, the gear 18 being keyed to rotate with the shaft 3, and hence to drive the gear 8 whenever the clutch 15 is in engagement. Other gears carried on the shaft 3 are a gear 19, which is freely rotatable thereon at all times and is in mesh with the gear 7 on the shaft 5 and with the differential driving gear 20, and a gear 21 keyed to the shaft 3 and engaged with the gear 9, and another gear 22 also keyed with the shaft 3 and engaged to drive the gear 10 through an intermediate gear 23 mounted on a shaft 24 disposed behind and between the shafts 5 and 3.

The action of the transmission will be readily understood from the foregoing description, the direct drive being secured when the clutch 10 is in engagement from the shaft 2 to the shaft 5 and then to the differential driving gear 20 through the gears 7 and 19. By disengaging the direct driving clutch 10, and continuing the movement of the lever 16 which action engages the clutch 15 and the clutch 11, the drive is transmitted from the gear 6 to the gear 14, thence to the shaft 3 and back to the shaft 5, through gears 18 and 8 and then to the differential gear 20 through gears 7 and 19. When the clutch 15 is engaged and the clutch 11 is disengaged the drive is transmitted through the shaft 3 to the gear 21 and then to the gear 9 and to the shaft 5 upon engagement of the clutch 12, and from the shaft to the gear 20 through gears 7 and 19. A reverse drive is secured if the clutch 13, instead of the clutch 12, is engaged, the drive then coming from the shaft 3 through gears 22, 23 and 10 to the shaft 5 and to the differential gear 20 through gears 7 and 19. By such an arrangement of shafts and gears a direct all gear connection is provided from the driving shaft 2 to the differential gear 20, and not only are but two shafts used, but there is no chain connection necessary. The final connection is through the free gear 19 for each speed.

The differential gear 20 is keyed to a differential carrier 25, carrying bevel gears 27, which are splined on shafts 4, which may be regarded as the driven or propeller shafts, although each of the shafts 4 is recessed to form a bearing for a disconnected extension 29 of each driven or propeller shaft. The differential carrier 25 is extended in the form of a sleeve 30 around the shaft 4, terminating in a splined collar or clutch member 31. Similarly the shafts 4 terminate in splined collars or clutches 32 of the same size and adjacent to the clutches 31, while the shafts 29 are provided with the same form of splined ends 28, also disposed adjacent to the clutch members 32. The construction of these members 31, 32 and 28 is shown in Fig. 7, while in Figs. 3, 4, 5 and 6 is shown a slidable collar or casing 34 adapted to be moved longitudinally of the shafts 4 and 29 into any of the positions shown in Figs. 3, 4, 5 and 6 with respect to the members 31, 32 and 28. The casing 34 is provided internally with a series of longitudinally extending shoulders 35, which receive between them the splines or shoulders on the members 31, 32 and 28.

This casing 34 is shown in the normal driving position in Fig. 1, that is, with the members 32 and 28 and the shafts 4 and 29, respectively, locked together to provide a direct drive between these two shafts. If it is desired to lock the differential so that the differential mechanism does not differentiate between the shafts 4, then the member 34 is moved into the position shown in Fig. 6, in which they are all locked together by means of the collar 34 against any relative rotation. By a further movement of the casing 34 over the members 31, 32 and 28 into the position shown in Fig. 4, the propeller shaft 29 is unlocked from the driving action of the shaft 4 and the differential 25, by means of the enlarged portion 36 in the inside of the casing 34, which is sufficiently large to entirely clear the member 28 when moved into this position. It will of course be understood that either of the propeller shafts 29, may be driven alone, and Figs. 4 and 5 show the condition when one propeller shaft, (which is the one shown from the left of these two figures) is unlocked from the differential shaft, and when the other propeller shaft, (which is the one shown in the right of these two figures) is locked to the differential and driven thereby.

Suitable mechanism may of course be provided for shifting and holding in each operative position the casing 34, and while such mechanism is not shown, it may be readily connected to a shaft 37 operating a member 38 having a yoked engagement with a shifting collar 39 attached to each of the casings 34.

In Fig. 2 are shown the relative position and arrangement of the shafts of the transmission and differential mechanism in end elevation. The arrangement allows a very compact casing in which all shafts are in vertical alinement, except of course for the short reverse gear's shaft 24. This in turn allows the propeller shafts to be disposed centrally of a vehicle in which the mechanism is installed, which is usually desirable but is not possible in many cases on account of the construction of the transmission mechanism.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In transmission mechanism, the combination of a driving shaft, a second shaft in alinement therewith and adapted to be directly engaged therewith, a counter shaft parallel with said driving and second shaft, a differential mechanism having its axis in the same plane as the axes of said shafts, and means adapted to variously drive said differential mechanism from said driving shaft through either said second shaft or said counter shaft.

2. In transmission mechanism, the combination of a driving shaft, a second shaft in alinement therewith and adapted to be directly engaged therewith, a counter shaft parallel with said driving and second shaft, gears on said driving and second shaft and gears on said counter shaft meshing therewith, means adapted to clutch said gears to their respective shafts, a gear fixed to said second shaft, a gear free on said counter shaft and in mesh with said fixed gear, and a differential mechanism connected to and operated by said free gear.

3. In a transmission mechanism for a four-wheel drive vehicle comprising a driving shaft, a second shaft axially alined therewith, a countershaft vertically below said driving and second shafts, means adapted to operate said second shaft directly from said driving shaft or from said countershaft, a differential mechanism and shafts therefor disposed below and in vertical alinement with said above-named shafts, and gear means adapted to operate said differential mechanism from said second shaft.

4. In a transmission mechanism for a four-wheel drive vehicle comprising a driving shaft, a second shaft axially alined therewith, a countershaft vertically below said driving and second shafts, means adapted to operate said second shaft directly from said driving shaft or form said countershaft, a differential mechanism and shafts therefor disposed below and in vertical alinement with said above-named shafts, and gear means adapted to operate said differential mechanism from said second shaft, said gear means including a gear freely rotatable on said countershaft.

Signed by me this 17 day of July, 1918.

ROBERT KECK.